US008369887B2

(12) United States Patent  (10) Patent No.: US 8,369,887 B2
Choe et al.  (45) Date of Patent: Feb. 5, 2013

(54) MOBILE TERMINAL USING PROXIMITY SENSOR AND METHOD OF CONTROLLING THE MOBILE TERMINAL

(75) Inventors: Min Wook Choe, Seoul (KR); Seon Hwi Cho, Seoul (KR); Jung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/495,128

(22) Filed: Jun. 30, 2009

(65) Prior Publication Data

US 2010/0004033 A1  Jan. 7, 2010

(30) Foreign Application Priority Data

Jul. 1, 2008 (KR) .................. 10-2008-0063558

(51) Int. Cl.
*H04M 1/00* (2006.01)
*G06F 3/041* (2006.01)
*G06F 3/033* (2006.01)
*H04B 3/36* (2006.01)
*G08B 6/00* (2006.01)

(52) U.S. Cl. ............... 455/550.1; 345/173; 345/157; 340/407.1; 340/407.2

(58) Field of Classification Search .............. None
See application file for complete search history.

(56) References Cited

U.S. PATENT DOCUMENTS

| | | | | |
|---|---|---|---|---|
| 6,819,945 | B1* | 11/2004 | Chow et al. | 455/567 |
| 7,801,569 | B1* | 9/2010 | Zellner | 455/567 |
| 2002/0056053 | A1* | 5/2002 | Vine et al. | 714/4 |
| 2003/0217312 | A1* | 11/2003 | Smith | 714/57 |
| 2004/0103156 | A1* | 5/2004 | Quillen et al. | 709/206 |
| 2005/0030292 | A1 | 2/2005 | Diederiks | |
| 2005/0231489 | A1* | 10/2005 | Ladouceur et al. | 345/184 |
| 2006/0066569 | A1* | 3/2006 | Eid et al. | 345/156 |
| 2006/0234693 | A1* | 10/2006 | Isidore et al. | 455/422.1 |
| 2007/0005835 | A1* | 1/2007 | Grant et al. | 710/62 |
| 2007/0033259 | A1* | 2/2007 | Wies et al. | 709/206 |
| 2008/0114675 | A1* | 5/2008 | Ward | 705/39 |
| 2008/0238886 | A1* | 10/2008 | Bengtsson et al. | 345/177 |
| 2009/0106655 | A1* | 4/2009 | Grant et al. | 715/702 |
| 2009/0135164 | A1* | 5/2009 | Kyung et al. | 345/179 |
| 2009/0270045 | A1* | 10/2009 | Flaherty | 455/73 |
| 2010/0156818 | A1* | 6/2010 | Burrough et al. | 345/173 |
| 2011/0260996 | A1* | 10/2011 | Henricson | 345/173 |

FOREIGN PATENT DOCUMENTS

| | | |
|---|---|---|
| CN | 1607735 A | 4/2005 |
| EP | 0866592 A2 | 9/1998 |
| EP | 1 523 163 A1 | 4/2005 |
| WO | WO 2007/065483 A1 | 6/2007 |

* cited by examiner

*Primary Examiner* — Dwayne Bost
*Assistant Examiner* — Christopher Kohlman
(74) *Attorney, Agent, or Firm* — Birch, Stewart, Kolasch & Birch, LLP

(57) ABSTRACT

A mobile terminal and a method of controlling the mobile terminal are provided. The mobile terminal may generate a haptic effect whose intensity or pattern corresponds to the type and importance of an event occurred therein. Therefore, it is possible for a user to easily identify the event based on the haptic effect. Since the mobile terminal generates a haptic effect in response to a command input thereto by the user, it is possible to prevent a command from being accidently input to the mobile terminal.

36 Claims, 14 Drawing Sheets (a)

(b)

(a)            (b)

(a)            (b)

(a)          (b)

(a)          (b)

(a)  (b)

(a)  (b)

(a)

(b)

(c)

(d)

(a)

(b)

(c)

(a)          (b)

(a)          (b)

(a) (b)

(a) (b)

(a)  (b)

MOBILE TERMINAL USING PROXIMITY SENSOR AND METHOD OF CONTROLLING THE MOBILE TERMINAL

CROSS-REFERENCE TO RELATED APPLICATION

This application claims the priority benefit of Korean Patent Application No. 10-2008-0063558, filed Jul. 1, 2008, respectively, in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and more particularly, to a mobile terminal and a method of controlling the mobile terminal in which different haptic effects having different intensities or patterns can be generated for different events.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. The size of mobile terminals may be insufficient to properly perform data input and output functions even if they are equipped with full-touch screens. Therefore, it is necessary to develop ways to control the operation of a mobile terminal using a new data input/output method, instead of navigating through a complicated menu structure, and thus efficiently use various functions provided by the mobile terminal.

SUMMARY OF THE INVENTION

The present invention provides a mobile terminal including a haptic module generating a haptic effect and a controller controlling the haptic module to generate a haptic effect whose intensity or pattern corresponds to an event and a method of controlling the mobile terminal.

The present invention also provides a mobile terminal including a proximity sensor capable of determining the distance between the mobile terminal and an object nearby and approaching the mobile terminal and a haptic module generating a haptic effect whose intensity or pattern corresponds to the result of the determination performed by the proximity sensor.

According to an aspect of the present invention, there is provided a method of controlling a mobile terminal, the method including detecting the occurrence of an event; determining whether the event is a haptic-effect-accompanying event, which is an event set in advance to accompany a haptic effect; and if the event is determined to be a haptic-effect-accompanying event, generating a first haptic effect corresponding to the event or a video/audio effect generated in response to the occurrence of the event.

According to another aspect of the present invention, there is provided a mobile terminal including a controller configured to detect the occurrence of an event, determine whether the event is a haptic-effect-accompanying event, which is an event set to accompany a haptic effect, and generate a first haptic effect corresponding to the event or a video/audio effect generated in response to the occurrence of the event if the event is determined to be a haptic-effect-accompanying event.

According to another aspect of the present invention, there is provided a computer-readable recording medium having recorded thereon a program for executing a method of controlling a mobile terminal, the method including detecting the occurrence of an event; determining whether the event is a haptic-effect-accompanying event, which is an event set to accompany a haptic effect; and if the event is determined to be a haptic-effect-accompanying event, which is an event set to accompany a haptic effect, generating a first haptic effect corresponding to the event or a video/audio effect generated in response to the occurrence of the event.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device.

Figure 1:
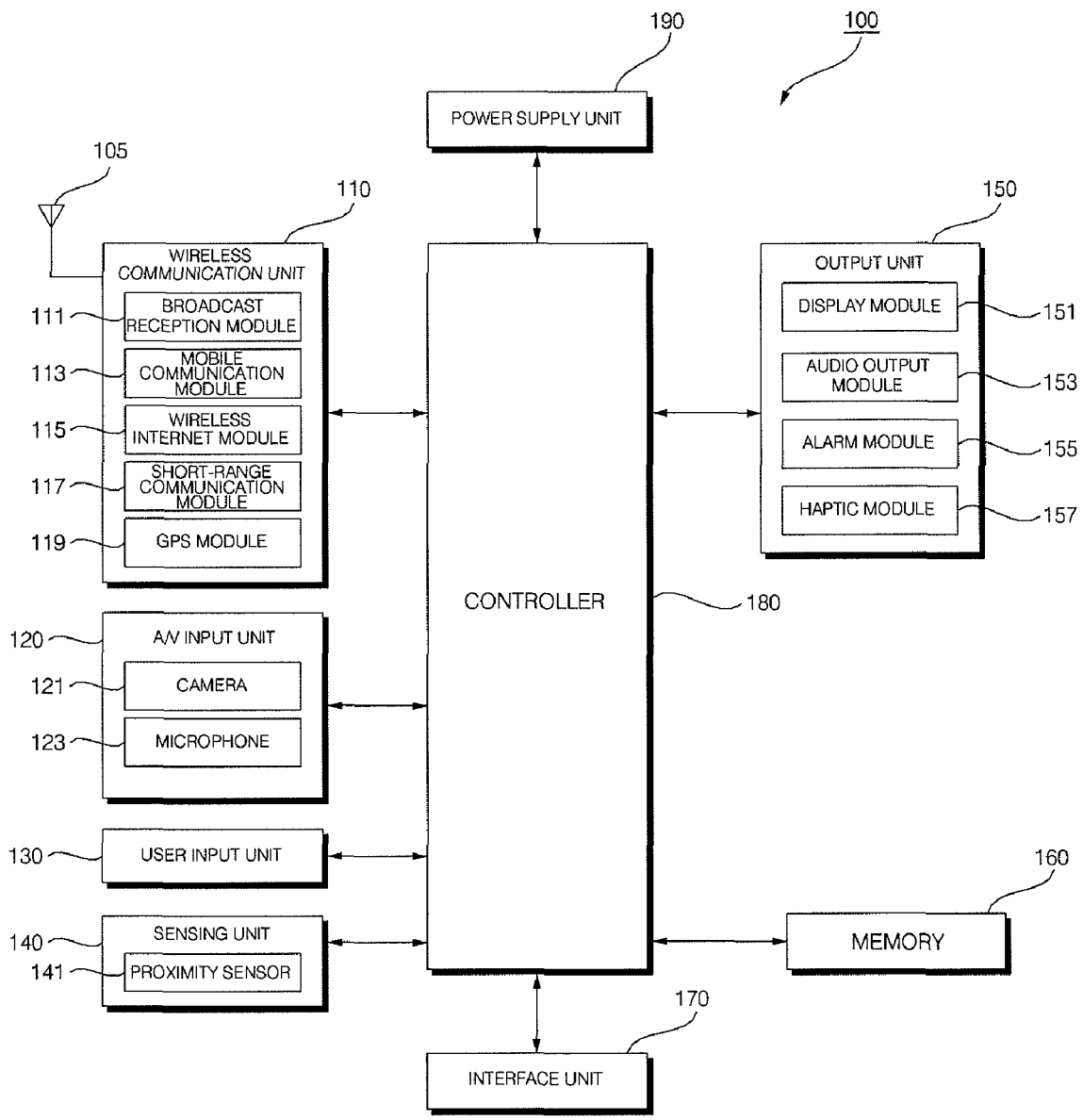
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The exterior of the mobile terminal 100 will hereinafter be described in detail with reference to FIGS. 2 and 3. For convenience, assume that the mobile terminal 100 is a bar-type mobile terminal equipped with a full-touch screen. However, the present invention is not restricted to a bar-type mobile terminal. Rather, the present invention can be applied to various mobile phones, other than a bar-type mobile terminal.

Figure 2:
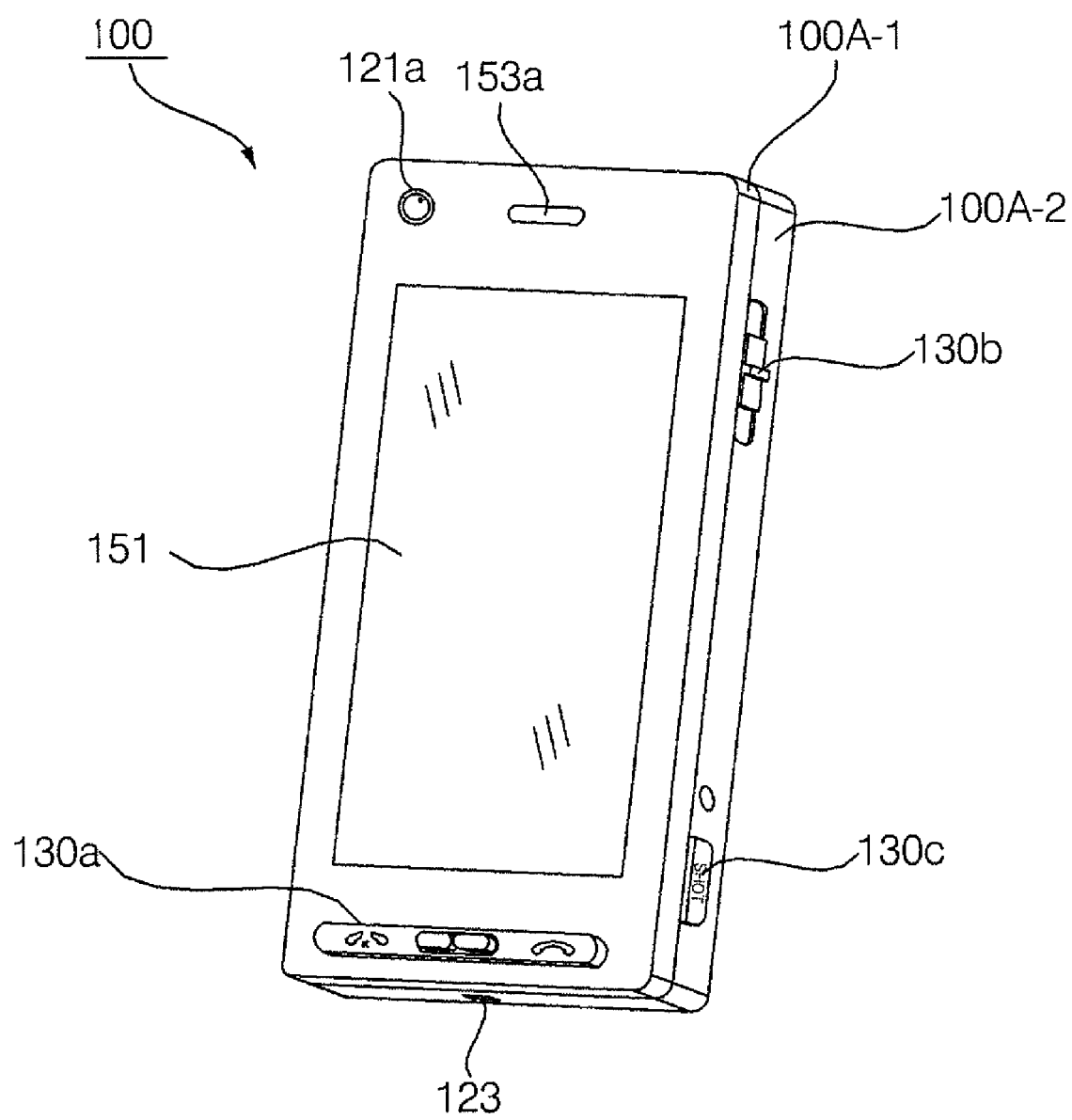
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a and a first user input unit 130a may be disposed in the front case 100A-1. A second user input unit 130b, a third user input unit 130c and the microphone 123 may be disposed on one side of the rear case 100A-2.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The first audio output module 153a may be implemented as a receiver or a speaker. The first camera 121a may be configured to capture a still image or a moving image of the user. The microphone 123 may be configured to properly receive the user's voice or other sounds.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating certain functions of the mobile terminal 100.

Figure 3:
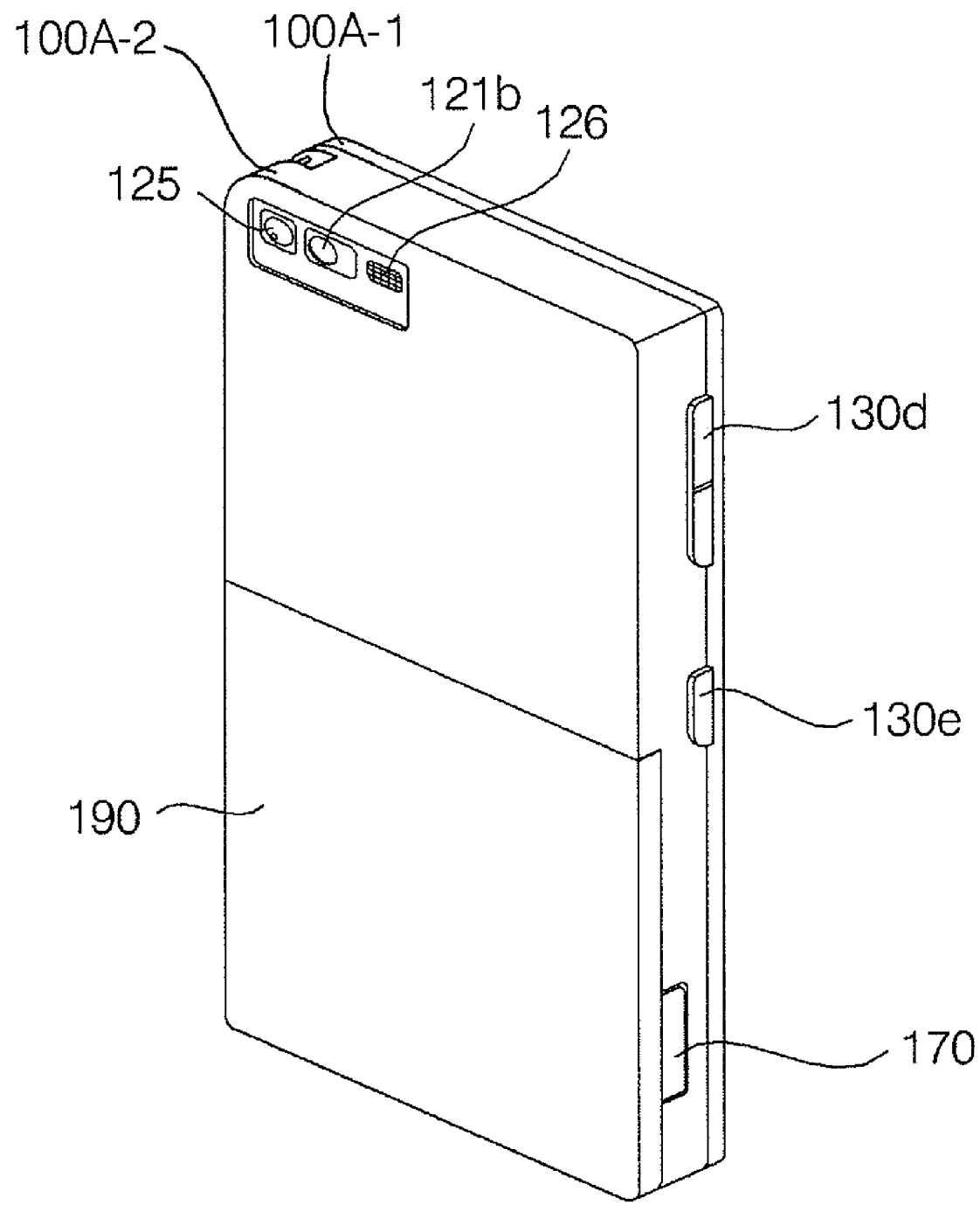
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input unit 130d, a fifth user input unit 130e and the interface unit 170 may be disposed on one side of the rear case 100A-2, and a second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare himself or herself for taking a self shot. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used during a speaker-phone mode.

An antenna (not shown) for receiving a broadcast signal may be disposed on one side of the rear case 100A-2. The antenna may be installed so as to be able to be pulled out of the rear case 100A-2.

The interface unit 170 may serve as a path for allowing the mobile terminal 100 to exchange data with an external device. For example, the interface unit 170 may be a connector for connecting an earphone to the mobile terminal 100 in an either wired or wireless manner, a port for short-range communication or a power supply port for supplying power to the mobile terminal 100. The interface unit 170 may be a card socket for accommodating an exterior card such as a SIM or UIM card or a memory card.

The second camera 121b and the other elements that have been described as being provided on the rear case 100A-2 may be provided on the front case 100A-1.

In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

The proximity sensor 141, which is installed in the front case 100A-1, may detect an object (such as the user's finger), if any, nearby and approaching the display module 151 and may output a proximity signal. The proximity sensor 141 may be configured to output various proximity signals according to the distance between the display module 151 and the detected object. For this, a plurality of proximity sensors 141 with different detection ranges may be provided. Then, the distance between the display module 151 and the detected object may be determined by comparing a plurality of proximity signals respectively provided by the plurality of proximity sensors 141. In addition, it may be determined what part of the display module 151 is being approached by the detected object and whether the detected object is being moved within the close vicinity of the display module 15 by determining which of the plurality of proximity sensors 141 is outputting a proximity sensor. Then, the controller 180 may control the haptic module 157 to generate a haptic-effect signal corresponding to a touch key currently being approached by the detected object.

Figure 4:
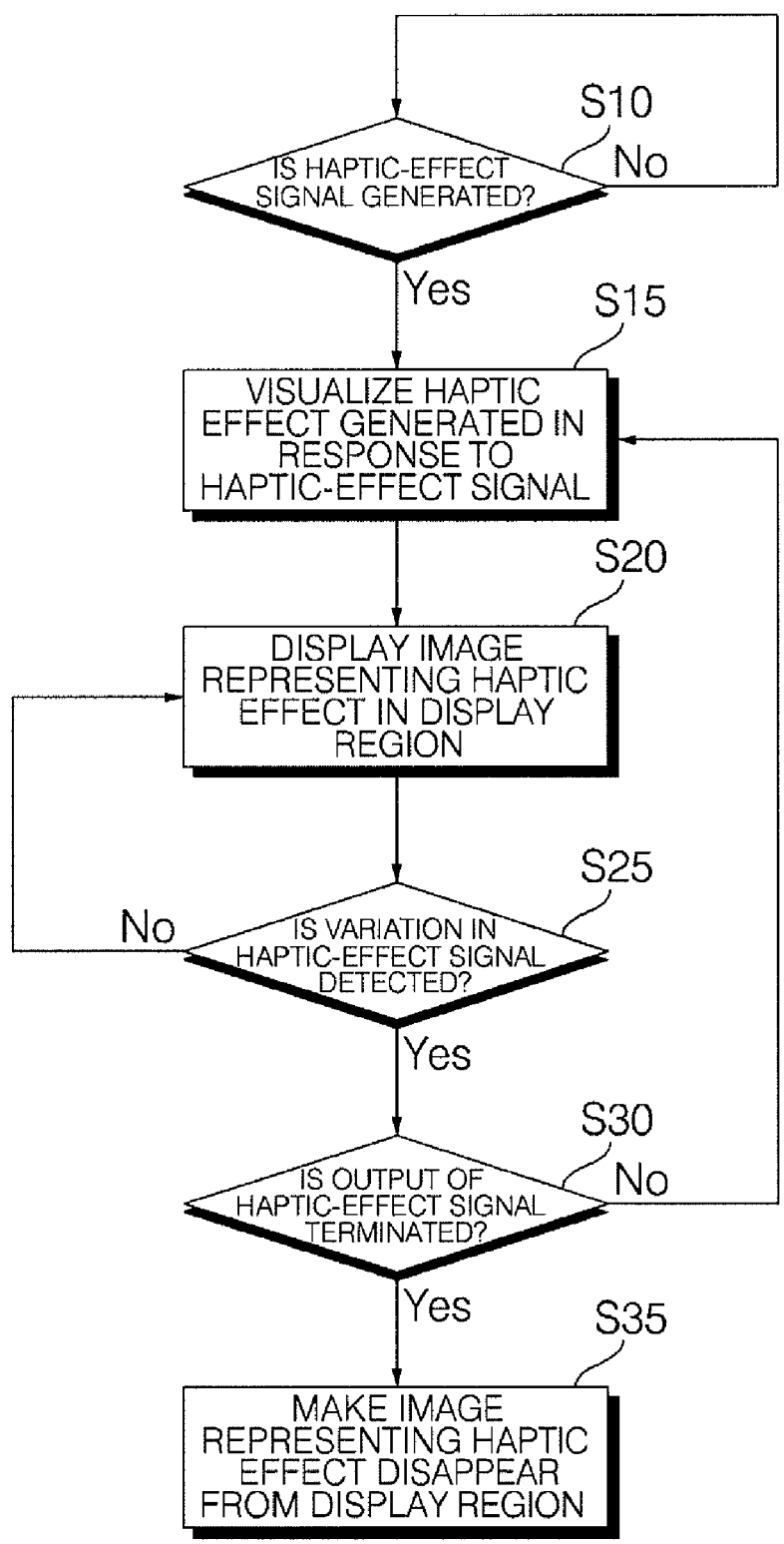
FIG. 4 illustrates a flowchart of a method of controlling a mobile terminal according to an exemplary embodiment of the present invention.

FIG. 4 illustrates a flowchart of a method of controlling a mobile terminal according to a first exemplary embodiment of the present invention. Referring to FIG. 4, the controller 180 may determine if a haptic-effect signal is generated (S10). If the haptic-effect signal is generated, the controller 180 may visualize (e.g., generate) a haptic-effect pattern as an image (S15) and display the visualized image on a screen of the mobile terminal while generating the haptic effect (S20). The controller 180 may also determine if there is a subsequent variation in the haptic-effect signal (S25). If there is no variation in the haptic-effect signal, the mobile terminal continues to display the visualized haptic-effect pattern (S20). If there is a variation in the haptic-effect signal, the controller 180 determines if the detected haptic-effect signal is terminated (S30). If the haptic-effect signal is terminated, the controller 180 removes the image from the display (S35). If the haptic-effect signal is not terminated, the controller 180 visualizes (e.g., generates) a new haptic-effect pattern as a new image based on the detected variation (S 15). In another embodiment, if an event involving, for example, receiving a call, receiving a message or setting off the alarm occurs, the controller 180 may determine whether the event is an event set to accompany a haptic effect, i.e., a haptic-effect-accompanying event. Thereafter, if the occurred event is a haptic-effect-accompanying event, the controller 180 may generate a haptic effect (e.g., vibration) corresponding to the occurred event. If the occurred event is not a haptic-effect-accompanying event, the controller 180 may control the mobile terminal 100 to operate in accordance with the occurred event.

The intensity or pattern of a haptic effect generated by the haptic module 157 under the control of the controller 180 may vary according to the type, importance and name of an event occurred in the mobile terminal 100. That is, a haptic effect generated by the haptic module 157 may represent the type, importance and name of an event occurred in the mobile terminal 100.

Therefore, the user may easily identify an event occurred in the mobile terminal 100 based on a haptic effect generated by the mobile terminal 100.

According to a first exemplary embodiment of the present invention, the controller 180 may classify an Internet access event, a Bluetooth connection event, and a messenger-network access event into a first-event group including events that occur in response to the issuance of a request for connection to an external mobile terminal by the user.

In addition, the controller 180 may classify a call-receiving event, a text/multimedia message-receiving event, and an email-receiving event into a second-event group including events that occur in response to the issuance of a request for access to the mobile terminal 100 by an external mobile terminal.

Moreover, the controller 180 may classify an alarm event, which is characterized by outputting an alarm sound at any alarm time set by the user, a scheduler event, which is characterized by outputting an alarm sound at any time scheduled by the user or displaying information regarding a scheduled event on the display module 151, and a battery-alert event, which is characterized by alerting the user when the remaining battery power of the mobile terminal 100 is less than a predefined level into a third-event group including events that belong to neither the first- nor second-event group.

Thereafter, if an event occurs, the controller 180 may classify the event into the first-, second- or third-event group and may control the haptic module 157 to generate a haptic effect whose intensity or pattern corresponds to whichever of the first- through third-event groups includes the occurred event. In this manner, the user may easily identify an event occurred in the mobile terminal 100 based on the intensity or pattern of a haptic effect generated by the haptic module 157. The intensity or pattern of a haptic effect generated by the haptic module 157 map be determined by the number of times a vibration occurs by the haptic module 157, the lasting time of the vibration or the area on which the vibration occurred.

According to a second exemplary embodiment of the present invention, the controller 180 may control the haptic module 157 to generate a haptic effect corresponding to the shape of a letter (or, corresponding to a letter) in the name of an event. For example, if a multimedia message sent by an external mobile terminal is received, the controller 180 may determine that an event has occurred, and may control the haptic module 157 to generate a haptic effect corresponding to the shape of the letter 'M' in the name of the event, i.e., 'Multimedia Message Service.' Then, the user may easily determine whether the event is a multimedia message-receiving event based on the haptic effect generated by the haptic module 157.

According to a third exemplary embodiment of the present invention, the controller 180 may control the haptic module 157 to generate a haptic effect corresponding to an operation performed by the mobile terminal 100 in response to the occurrence of an event. For example, if a call-receiving event occurs, the controller 180 may control the audio output module 153 to output a ring tone. The ring tone output by the audio output module 153 may vary from one caller to another caller. Then, the controller 180 may control the haptic module 157 to generate a haptic effect corresponding to the ring tone output by the audio output module 153.

According to a fourth exemplary embodiment of the present invention, if the mobile terminal 100 uses at least two SIM cards or at least two phone numbers, the controller 180 may number the SIM cards or the phone numbers and may then control the haptic module 157 to generate a haptic effect corresponding to the number of whichever of the SIM cards or phone numbers is used in association with an event occurred in the mobile terminal 100. In this manner, the user may easily identify which of the SIM cards or phone numbers is used in association with an event occurred in the mobile terminal 100 with his or her sense of touch based on a haptic effect generated by the mobile terminal 100.

According to a fifth exemplary embodiment of the present invention, the controller 180 may control the haptic module 157 to generate a haptic effect when an important icon or item is encountered. For example, if the user scrolls through a schedule list or a phone number list is displayed on the display module 151, the controller 180 may control the haptic module 157 to generate a haptic effect whenever a scheduled event or phone number deemed important by the user is encountered.

More specifically, the controller 180 may display a list of items (such as a list of received messages, emails or calls) on the display module 151. In particular, a list of calls may display the phone numbers of external mobile terminals from which the mobile terminals 100 has received calls and the phone numbers of external mobile terminals to which the mobile terminals 100 has made calls. Then, if the user encounters one of the items of the list deemed important while scrolling through the list, the controller 180 may control the haptic module 157 to generate a haptic effect in an area where the corresponding item is displayed.

For example, if a list of received messages is displayed, but not as a whole, in a display region on the display module 151, the user may scroll through the received message list by manipulating a navigation-function key provided on the mobile terminal 100, and may thus examine each of the received messages in the message list. If the user encounters an unread message while scrolling through the received message list, the controller 180 may control the haptic module 157 to generate a haptic effect in an area in the display region where the unread message is displayed.

If the unread message is yet to appear in the display region, the controller 180 may control the haptic module 157 to generate a haptic effect in an area in the display region corresponding to the relative position of the unread message to a number of messages currently being displayed in the display region. For example, if a list of received messages is displayed vertically, but not as a whole, on the display module 151 and an unread message is disposed at the bottom of the message list and is thus yet to appear in the display region, the controller 180 may control the haptic module 157 to generate a haptic effect at the bottom of the display region. Thus, the user may easily identify the location of the unread message in the message list with his or her sense of touch based on a haptic effect generated by the mobile terminal 100.

Likewise, if an email list is displayed, but not as a whole, in the display region and an email deemed important by the user is encountered while scrolling through the email list, the controller 180 may control the haptic module 157 to generate a haptic effect in an area in the display region where the corresponding email is displayed. If the email deemed important by the user is yet to appear in the display region, the controller 180 may control the haptic module 157 to generate a haptic effect in an area in the display region corresponding to the relative position of the corresponding email to a number of emails currently being displayed in the display region.

The sixth exemplary embodiment has been described, taking as an example a list of received messages including one or more unread messages. However, the present invention is not restricted to this. That is, the sixth exemplary embodiment can be applied to any list including items with different levels of importance.

The controller 180 may increase the intensity of a haptic effect according to the distance between an item deemed important by the user and either a cursor or an object detected to be nearby and approaching the display module 151 by the proximity sensor 141. In this manner, the user may be able be to not forget an important item in a list displayed on the display module 151 even when the important item is currently not being displayed on the display module 151.

According to a sixth exemplary embodiment of the present invention, if an event such as the arrival of a scheduled time for a predetermined scheduled event occurs, the controller 180 may control the haptic module 157 to generate a haptic effect indicating the arrival of the scheduled time for the predetermined scheduled event and a haptic effect indicating the importance of the predetermined scheduled event. Therefore, the user may easily recognize the arrival of the scheduled time for the predetermined scheduled event and the importance of the predetermined scheduled event with his or her sense of touch based on a number of haptic effects generated by the mobile terminal 100.

According to a seventh exemplary embodiment of the present invention, if the mobile terminal 100 is connected to an external mobile terminal, the controller 180 may control the haptic module 157 to generate a haptic effect indicating the type of connection between the mobile terminal 100 and the external mobile terminal and a haptic effect indicating the type of file transmitted from the external mobile terminal to the mobile terminal 100. For example, if a message-receiving event occurs in the mobile terminal 100, the controller 180 may control the haptic module 157 to generate a haptic effect indicating the occurrence of a message-receiving event in order to alert the user to the reception of a message. If a file is received along with the message, the controller 180 may also control the haptic module 157 to generate a haptic effect corresponding to the type of file received. In this manner, the user may easily recognize the occurrence of a message-receiving event and identify the type of file received along with a message with his or her sense of touch based on a number of haptic effects generated by the mobile terminal 100.

According to an eighth exemplary embodiment of the present invention, the controller 180 may execute various applications such as an Internet-connection application and an MP3 file-play execution. If a wireless signal received from an Internet-based network is weak, an error event may occur, indicating that the connection of the mobile terminal 100 to the Internet is unstable. An error event may also occur during the play of an MP3 file due to such problems as the sharing of resources in the mobile terminal 100.

The controller 180 may control the haptic module 157 to generate different haptic effects with different intensities or patterns for different error events that can occur in the mobile terminal 100. In this manner, the user may easily identify the type of error event occurred during the execution of an application in the mobile terminal 100 with his or her sense of touch based on a haptic effect generated by the mobile terminal 100.

According to a ninth exemplary embodiment of the present invention, if an event associated with the payment of charges or the transmission of personal information occurs in the mobile terminal 100, the controller 180 may control the haptic module 157 to generate a haptic effect in order to alert the user. In this manner, the user may prevent a command to pay charges or to transmit personal information from being entered without notice.

If an event associated with the payment of charges or the transmission of personal information occurs in the mobile terminal 100, the controller 180 may control the haptic module 157 to generate a haptic effect corresponding to the event. In this manner, the user may easily determine whether an application associated with the payment of charges or the transmission of personal information is being executed in the mobile terminal 100.

If a screen for executing an application associated with the payment of charges or the transmission of personal information is displayed on a touch screen, the controller 180 may detect the movement of a cursor for entering a command to pay charges or to input or transmit personal information. The controller 180 may detect any object nearby and approaching the touch screen with the use of the proximity sensor 141.

If there is detected a cursor being moved or an object nearby and approaching the touch screen, the controller 180 may control the haptic module 157 to generate a haptic effect. In this manner, it is possible to prevent the payment of charges or the transmission of personal information from being performed by accidentally touching a touch screen after the execution of an application associated with the payment of charges or the transmission of personal information.

According to a tenth exemplary embodiment of the present invention, if the mobile terminal 100 is connected to an external mobile terminal and a message-receiving event or a call-receiving event occurs in the mobile terminal 100, the controller 180 may control the haptic module 157 to generate a haptic effect corresponding to the external mobile terminal. In this manner, the user may easily identify the phone number or the user of the external mobile terminal without even looking at the screen of the mobile terminal 100.

More specifically, the controller 180 may identify an entry name or a group name with which the phone number of the external mobile terminal is registered in the mobile terminal 100. Thereafter, the controller 180 may control the haptic module 157 to generate a haptic effect corresponding to the entry name or the group name of the external mobile terminal. In this manner, the user may easily identify the entry name or the group name of the external mobile terminal with his or her sense of touch based on the haptic effect generated by the haptic module 157.

For example, if a message is received from a phone number registered with an entry name 'boyfriend' or 'girlfriend', the controller 180 may control the haptic module 157 to generate a haptic effect corresponding to the heart symbol. If a message is received from an unregistered phone number, the controller 180 may control the haptic module 157 to generate a haptic effect corresponding to an unregistered phone number.

If the mobile terminal 100 is equipped with a touch screen, the controller 180 may display a key for issuing a command to receive a call on the touch screen in response to a request for receiving a call. If an incoming call from an unregistered phone number such as a spam phone number is detected, the controller 180 may determine the distance between the key and an object detected to be nearby and approaching the touch screen by the proximity sensor 141. Thereafter, if it is determined that the distance between the object and the key is gradually decreasing, the controller 180 may control the haptic module 157 to generate a haptic effect in order to alert the user. In this manner, the user may easily identify an incoming call from an unregistered phone number with his or her sense of touch even while moving his or her finger close to the touch screen in order to receive the incoming call.

In addition, the controller 180 may control the haptic module 157 to generate a haptic effect even after the reception of an incoming call from an unregistered phone number (such as a spam phone number) in response to the issuance of a command to receive a call. In this manner, the user may easily identify an incoming call from an unregistered phone number (such as a spam phone number) with his or her sense of touch even after the reception of the incoming call.

Figure 5:
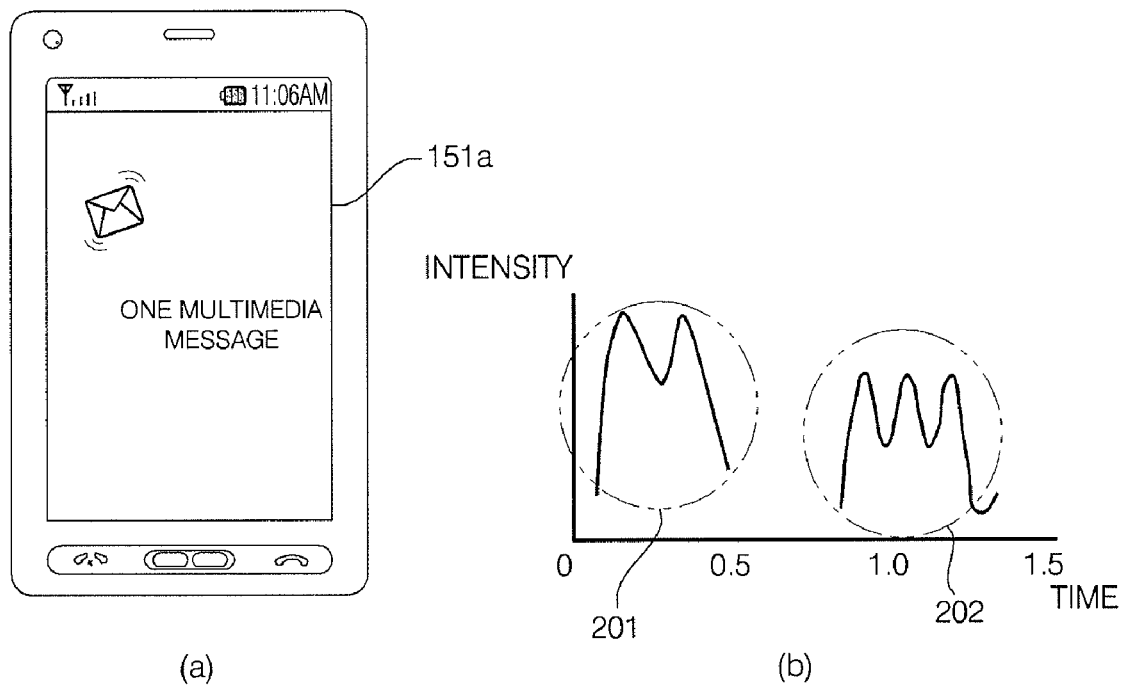
FIG. 5 illustrates diagrams for explaining the generation of a haptic effect upon the occurrence of an event according to a first exemplary embodiment of the present invention.

FIGS. 5(*a*) and 5(*b*) illustrate diagrams for explaining the first exemplary embodiment. Referring to FIGS. 5(*a*) and 5(*b*), the controller 180 may classify a number of events that are set in advance to accompany a haptic effect. Thereafter, if an event occurs in the mobile terminal 100, the controller 180 may control the haptic module 157 to generate a haptic effect whose intensity or pattern corresponds to the occurred event with reference to the results of the classification.

More specifically, referring to FIGS. 5(*a*) and 5(*b*), if a multimedia message-receiving event occurs, a screen indicating that a multimedia message has been received may be displayed in a display region 151*a*, and a haptic effect 201 indicating that a multimedia message-receiving event is classified into the second-event group and a haptic effect 202 indicating that a multimedia message-receiving event is a third event in the second-event group may be generated under the control of the controller 180.

Therefore, the user may easily identify that the occurred event is a multimedia message-receiving event classified as being a third event in the second-event group with his or her sense of touch based on the haptic effects 201 and 202.

Figure 6:
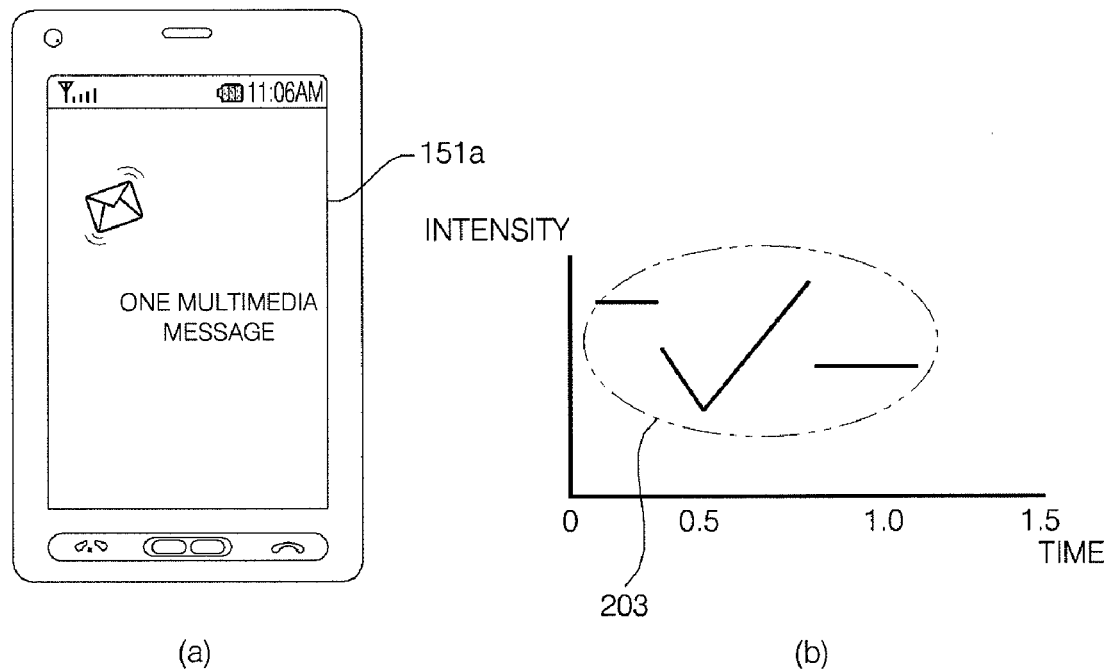
FIG. 6 illustrates diagrams for explaining the generation of a haptic effect upon the occurrence of an event according to a second exemplary embodiment of the present invention.

FIGS. 6(*a*) and 6(*b*) illustrate diagrams for explaining the second exemplary embodiment. Referring to FIGS. 6(*a*) and 6(*b*), if a multimedia message-receiving event occurs, a haptic effect 203 corresponding to the shape of the letter 'M' in the name of the occurred event, i.e., 'Multimedia Message-Receiving Event,' may be generated under the control of the controller 180.

Therefore, the user may easily identify that the occurred event is a multimedia message-receiving event with his or her sense of touch based on the haptic effect 203.

Figure 7:
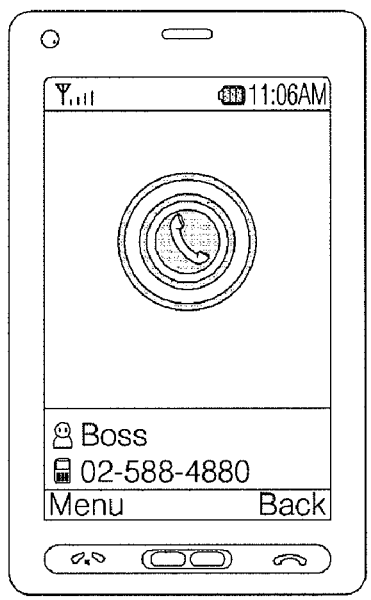
FIG. 7 illustrates diagrams for explaining the generation of a haptic effect upon the occurrence of an event according to a third exemplary embodiment of the present invention.
Figure 7:
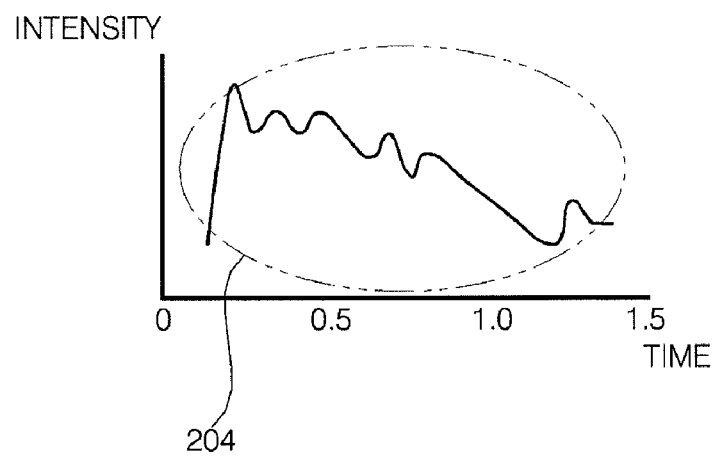

FIGS. 7(*a*) and 7(*b*) illustrate diagrams for explaining the third exemplary embodiment. Referring to FIGS. 7(*a*) and 7(*b*), if a call-receiving event occurs in response to the issuance of a request for receiving a call by an external mobile terminal, a ringtone may be output, and a haptic effect 204 corresponding to the intensity or pattern of the ringtone may be generated under the control of the controller 180.

In this manner, the user may easily identify a caller based on the haptic effect 204. The haptic effect 204 may be generated even when no ringtone is output.

Figure 8:
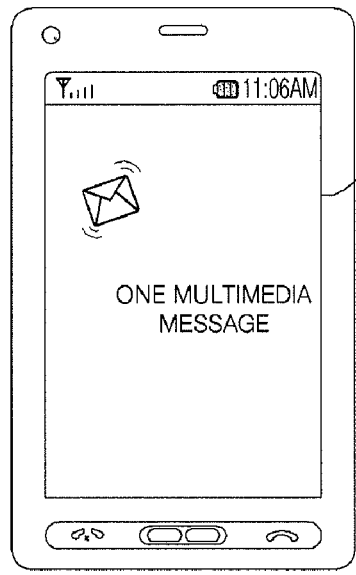
FIG. 8 illustrates diagrams for explaining the generation of a haptic effect upon the occurrence of an event according to a fourth exemplary embodiment of the present invention.
Figure 8:
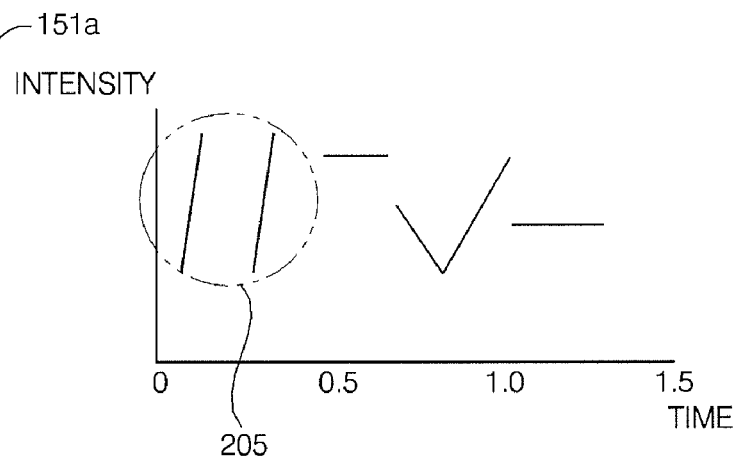

FIGS. 8(*a*) and 8(*b*) illustrate diagrams for explaining the fourth exemplary embodiment. Referring to FIGS. 8(*a*) and 8(*b*), if a multimedia message-receiving event occurs, the controller 180 may determine which of a plurality of SIM cards or phone numbers of the mobile terminal 100 is currently being used in association with the multimedia message-receiving event. For example, if the mobile terminal 100 is equipped with first and second SIM cards and the second SIM card is currently being used in association with the multimedia message-receiving event, a haptic effect 205 indicating that the second SIM card is currently being used in association with the multimedia message-receiving event may be generated under the control of the controller 180.

In this manner, when a multimedia message-receiving event occurs, the user may easily determine which of a plurality of SIM cards or phone numbers of the mobile terminal 100 is being used in association with the multimedia message-receiving event.

Figure 9:
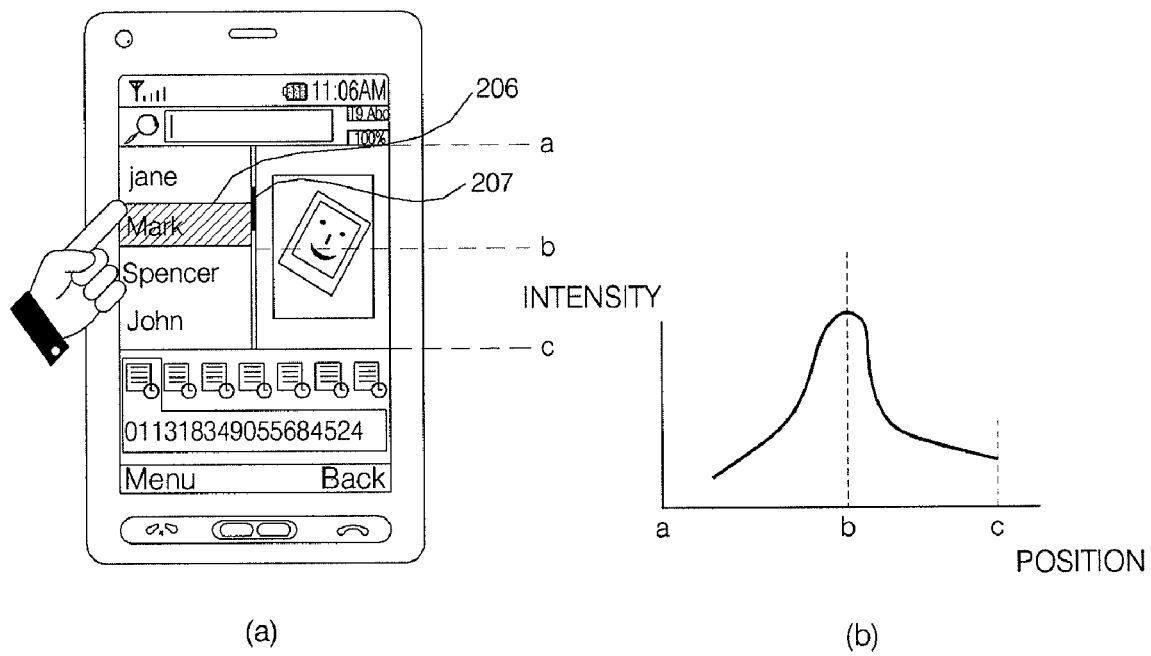
FIGS. 9 and 10 illustrate diagrams for explaining the generation of a haptic effect upon the occurrence of an event according to a fifth exemplary embodiment of the present invention.

FIGS. 9(*a*), 9(*b*), 10(*a*) and 10(*b*) illustrate diagrams for explaining the fifth exemplary embodiment.

Referring to FIGS. 9(*a*) and 9(*b*), if a phone number list is displayed in a display region and an item in the phone number list currently being pointed at by a cursor 206, i.e., an item 'Mark', corresponds to a most frequently called or received phone number, the controller 180 may recognize that the item 'Mark' is the most important item in the phone number list.

Then, the controller 180 may control the haptic module 157 to generate a haptic effect with highest intensity at a position b where the item 'Mark' is displayed. More specifically, if the user scrolls up the phone number list using a scroll bar 207 so that the item 'Mark' can be moved to a position a, the controller 180 may control the haptic module 157 to generate a haptic effect at the position a. If the user scrolls down the phone number list so that the item 'Mark' can be moved to a position c, the controller 180 may control the haptic module 157 to generate a haptic effect at the position c.

In this manner, the user may easily identify which item in the phone number list is an important item with his or her sense of touch based on the intensity of a haptic effect generated by the haptic module 157.

Figure 10:
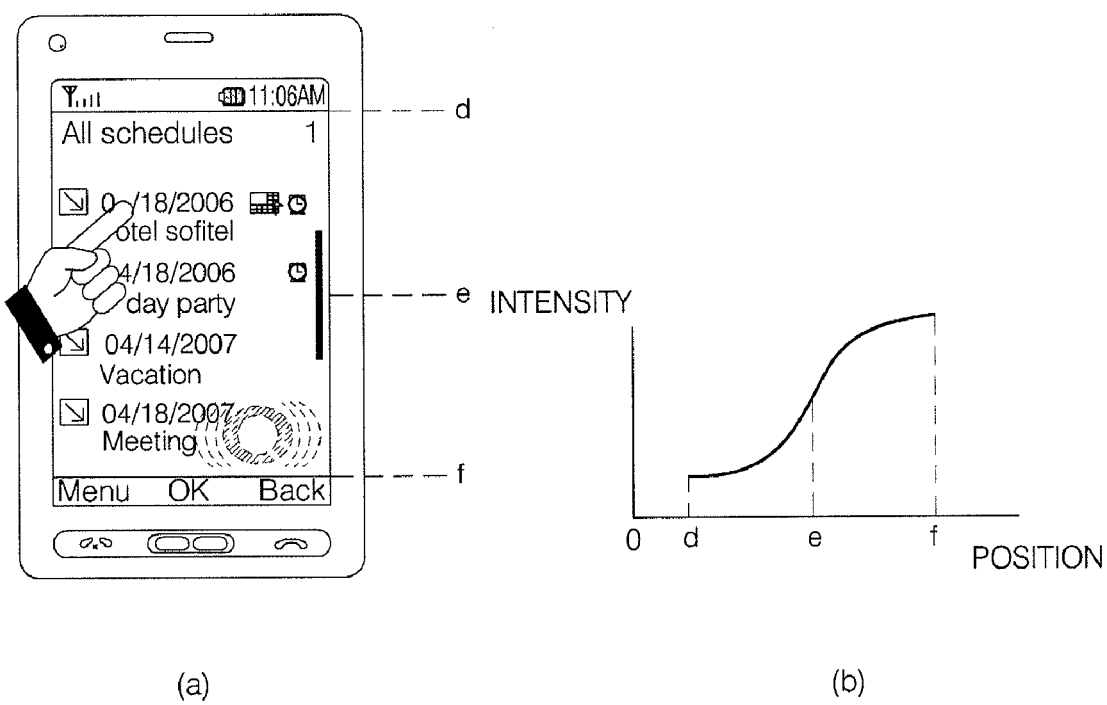

Referring to FIGS. 10(*a*) and 10(*b*), if a schedule list is displayed, but not as a whole, in a display region under the control of the controller 180, the user may identify each of a plurality of schedule items in the schedule list by scrolling up or down the schedule list. A schedule item deemed the most important by the user may not appear yet in a display region because of, for example, being located at the bottom of the schedule list. In this case, the controller 180 may control the haptic module 157 to generate a haptic effect whose intensity is higher at a position f than at a position d or e in order to alert the user to the relative position of the schedule item deemed the most important by the user to a number of schedule items currently being displayed in the display region.

The controller 180 may also control the haptic module 157 to generate a haptic effect according to the movement of a cursor or an object detected by the proximity sensor 141 toward an important schedule item.

Therefore, the user may identify an important schedule item in a schedule list with his or her sense of touch even when the important schedule item is not displayed or highlighted.

Figure 11:
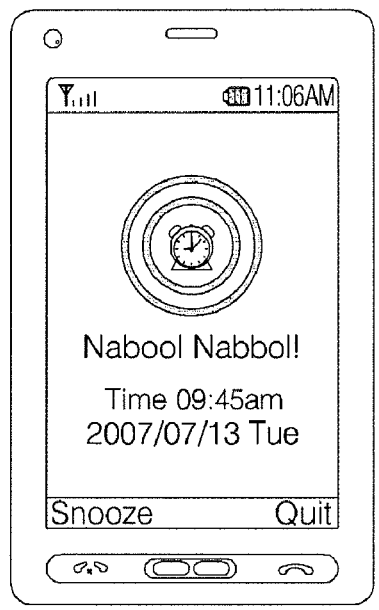
FIG. 11 illustrates diagrams for explaining the generation of a haptic effect upon the occurrence of an event according to a sixth exemplary embodiment of the present invention.
Figure 11:
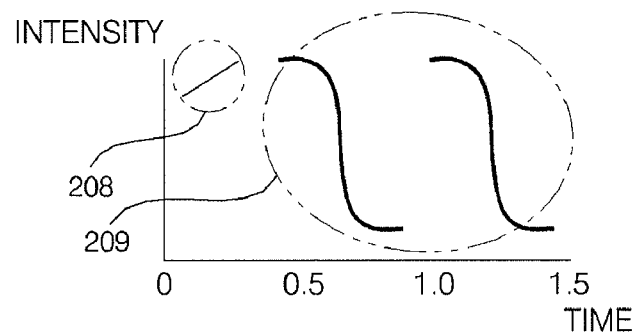

FIGS. 11(*a*) and 11(*b*) illustrate diagrams for explaining the sixth exemplary embodiment. Referring to FIGS. 11(*a*) and 11(*b*), the controller 180 may display a schedule screen in a display region upon the arrival of a schedule time for a predetermined scheduled event. Thereafter, the controller 180 may control the haptic module 157 to generate a haptic effect 208 in order to alert the user to the arrival of a schedule time. Thereafter, the controller 180 may control the haptic module 157 to generate a haptic effect 209 whose intensity or pattern corresponds to the importance of the predetermined scheduled event. Therefore, the user may recognize the arrival of a schedule time based on the haptic effect 208 and may determine the type or importance of the predetermined scheduled event based on the haptic effect 209. The user may set in advance the intensity or pattern of a haptic effect to be generated upon the arrival of a schedule time for a scheduled event when registering the scheduled event in the mobile terminal 100.

In this manner, the user may easily identify the arrival of a schedule time with his or her sense of touch upon the occurrence of a scheduler event.

Figure 12:
FIGS. 12 and 13 illustrate diagrams for explaining the generation of a haptic effect upon the occurrence of an event according to a seventh exemplary embodiment of the present invention.
Figure 12:
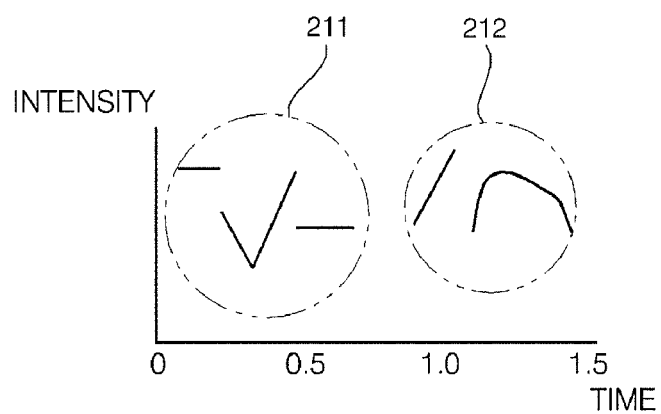

FIGS. 12(*a*), 12(*b*), 13(*a*) and 13(*b*) illustrate diagrams for explaining the seventh exemplary embodiment.

Referring to FIG. 12(*a*), if an external mobile terminal sends a message to the mobile terminal 100, a screen indicating the arrival of the message may be displayed in a display region. If there is a file attached to the message, the controller 180 may control the haptic module 157 to generate a haptic effect indicating the type of the attached file.

More specifically, referring to FIG. 12(*b*), the haptic module 157 may generate a haptic effect 211 indicating that a multimedia message has been received and a haptic effect 212 indicating that there is an image file attached to the multimedia message in order to alert the user.

Figure 13:
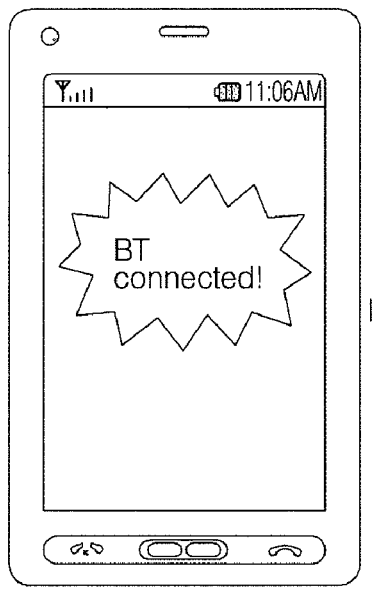
Figure 13:
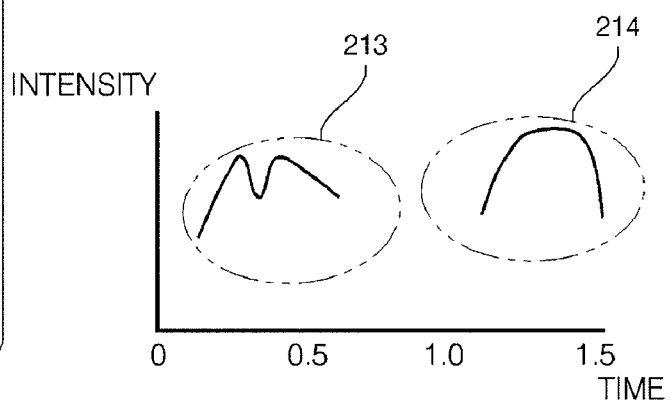

Referring to FIG. 13(*a*), if the mobile terminal 100 is connected to an external mobile terminal through a Bluetooth network, the controller 180 may display a screen indicating that the mobile terminal 100 is Bluetooth-connected to the external mobile terminal in a display region.

The controller 180 may detect a file, if any, sent to the mobile terminal 100 by the external mobile terminal. If the detected file is an MP3 file, the controller 180 may control the haptic module 157 to generate a haptic effect corresponding to an MP3 file.

Referring to FIG. 13(*b*), if a Bluetooth network-connection event occurs, the controller 180 may control the haptic module 157 to generate a haptic effect 213 corresponding to the shape of the letter 'B,' in order to alert the user to the connection of the mobile terminal 100 to an external mobile terminal. Thereafter, if an MP3 file is received from the external mobile terminal, the controller 180 may control the haptic module 157 to generate a haptic effect 214 corresponding to an MP3 file. In this manner, the user may easily determine whether the mobile terminal 100 is connected to an external mobile terminal and identify the type of file, if any, received from the external mobile terminal based on the haptic effects 213 and 214.

Alternatively, the controller 180 may control the haptic module 157 to generate a haptic effect corresponding to the type of event occurred in the mobile terminal 100, instead of a haptic effect corresponding to the shape of the first letter in the name of an event occurred in the mobile terminal 100 or a haptic effect indicating the type of file received from an external mobile terminal, if any, connected to the mobile terminal 100.

Figure 14:
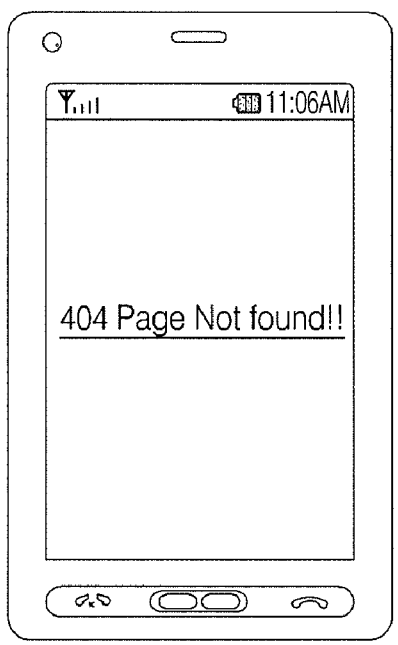
FIGS. 14 and 15 illustrate diagrams for explaining the generation of a haptic effect upon the occurrence of an event according to a eighth exemplary embodiment of the present invention.
Figure 14:

FIGS. 14(*a*), 14(*b*) and 15(*a*) through 15(*d*) illustrate diagrams for explaining the eighth exemplary embodiment. More specifically, FIG. 14(*a*) illustrates a diagram of an error screen displayed upon the occurrence of an error event during the connection of the mobile terminal 100 to the internet, and FIG. 14(*b*) illustrates a diagram of an error screen displayed upon the occurrence of an error event during the opening of a document, moving-image or MP3 file. Referring to FIGS. 14(*a*) and 14(*b*), if an error event occurs, the controller 180 may control the haptic module 157 to generate a haptic effect indicating the type of the error event. Thus, the user may easily identify the type of error event occurred in the mobile terminal 100 with his or her sense of touch.

Figure 15:
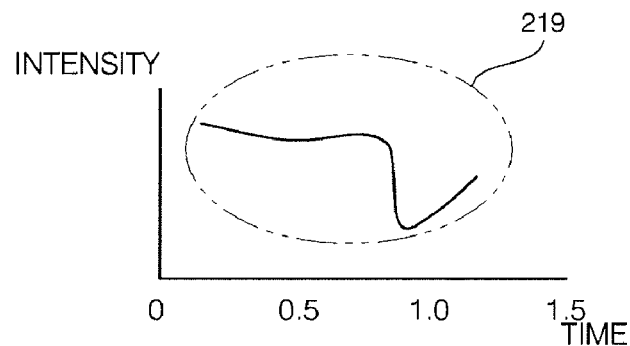
Figure 15:
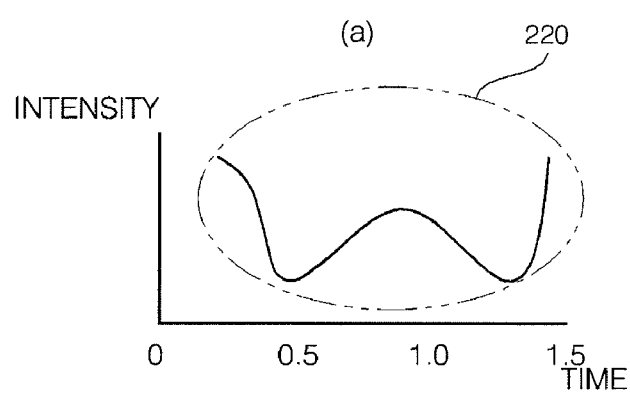
Figure 15:
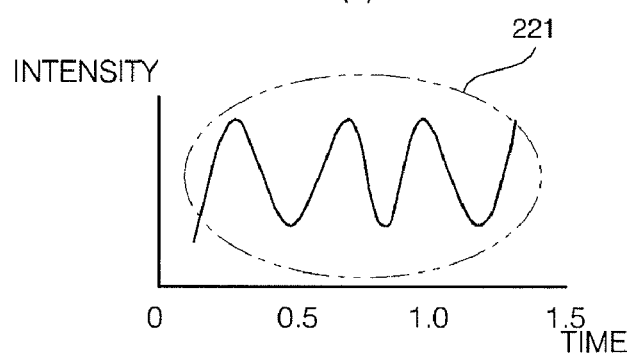
Figure 15:
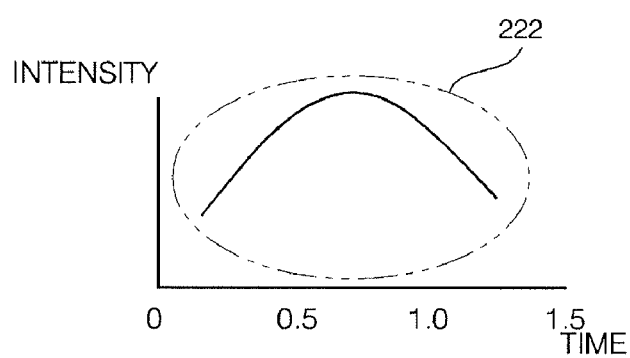

FIGS. 15(*a*) through 15(*d*) illustrate diagrams showing various patterns of haptic effects that can be generated by the haptic module 157 upon the occurrence of an error event during the connection of the mobile terminal 100 to the internet.

Referring to FIG. 15(*a*), if a desired webpage cannot be found, the controller 180 may control the haptic module 157 to generate a haptic effect 219. Referring to FIG. 15(*b*), if the mobile terminal 100 fails to be connected to a network, the controller 180 may control the haptic module 157 to generate a haptic effect 220. Referring to FIG. 15(*c*), if an error occurs for an unknown reason, the controller 180 may control the haptic module 157 to generate a haptic effect 221. Referring to FIG. 15(*d*), if a desired webpage is successfully received through the internet, the controller 180 may control the haptic module 157 to generate a haptic effect 222.

In this manner, the user may easily identify the type of error event that may occur during the connection of the mobile terminal 100 to the internet based on the pattern of a haptic effect generated by the haptic module 157.

Figure 16:
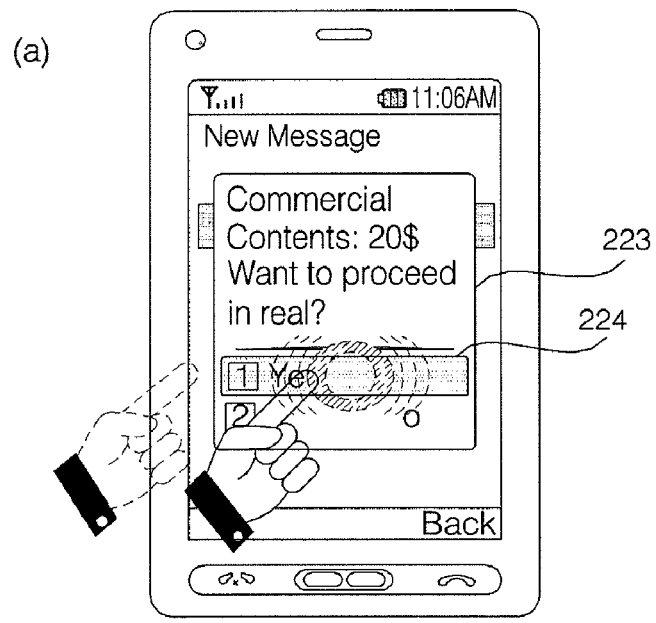
FIGS. 16 and 17 illustrate diagrams for explaining the generation of a haptic effect upon the occurrence of an event according to a ninth exemplary embodiment of the present invention.
Figure 16:
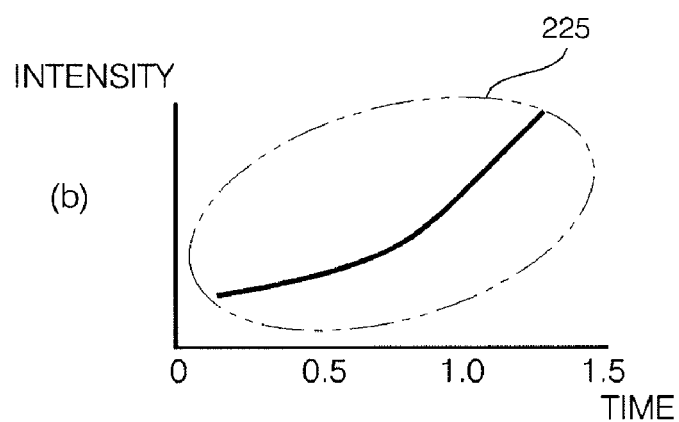
Figure 16:
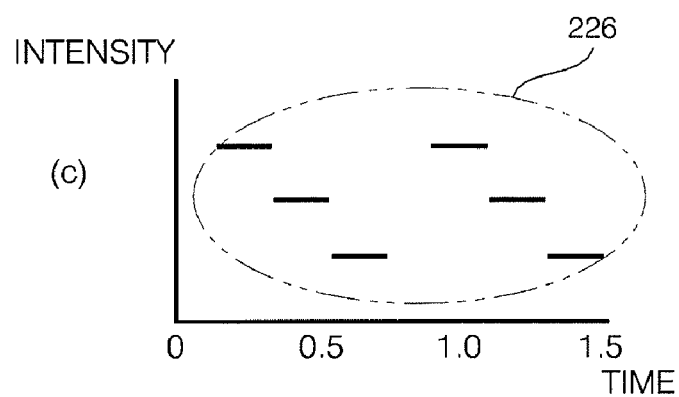

FIGS. 16(*a*) through 16(*c*), 17(*a*) and 17(*b*) illustrate diagrams for explaining the ninth exemplary embodiment. Referring to FIGS. 16(*a*) through 16(*c*), 17(*a*) and 17(*b*), the controller 180 may control the haptic module 157 to generate a haptic effect upon the occurrence of an event associated with the payment of charges or the transmission of personal information. Then, the user may identify whether a command to pay charges or send personal information has been issued based on a haptic effect generated by the haptic module 157.

More specifically, referring to FIG. 16(*a*), a screen 223 for the payment of charges may be displayed in a display region. If the user touches a key 224 to pay charges, the controller 180 may determine that a command to pay charges has been issued. Alternatively, the controller 180 may determine the distance between the user's finger and the key 224 based on a signal provided by the proximity sensor 141. Then, if it is determined that the distance between the user's finger and the key 224 has gradually decreased, the controller 180 may control the haptic module 157 to generate a haptic effect 225 in order to alert the user to the approach of the user's finger to the key 224.

Referring to FIG. 16(c), once the key 224 is touched or approached by the user's finger, the controller 180 may control the haptic module 157 to generate a haptic effect 226 in order to alert the user to the payment of charges.

Figure 17:
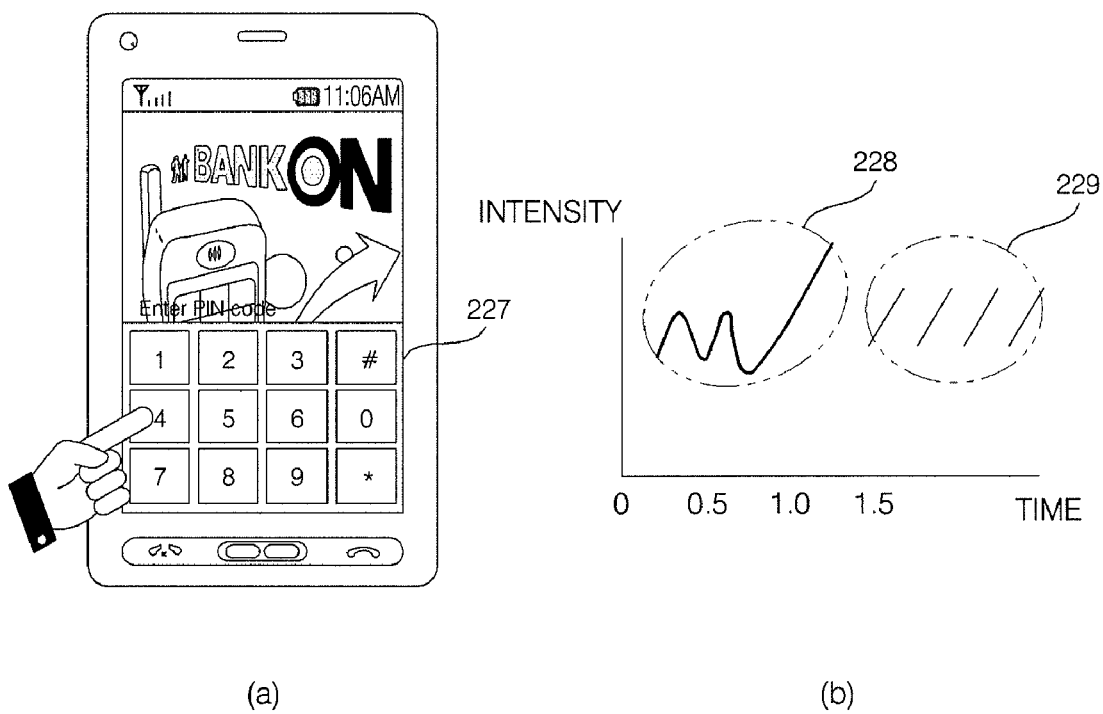

Referring to FIG. 17(a), the controller 180 may control a key 227 to input or send personal information to be displayed. Thereafter, the controller 180 may determine the distance between the user's finger and the key 227 based on a signal provided by the proximity sensor 141. Then, if it is determined that the distance between the user's finger and the key 227 has gradually decreased, the controller 180 may control the haptic module 157 to generate a haptic effect 228 in order to alert the user to the approach of the user's finger to the key 227.

Once personal information is input to the mobile terminal 100 by the user, the controller 180 may control the haptic module 157 to generate a haptic effect 229. Thus, the user may easily identify whether the key 227 is being manipulated based on the haptic effect 229.

FIGS. 18(a), 18(b), 19(a), 19(b), 20(a), 20(b), 21(a) and 21(b) illustrate diagrams for explaining the tenth exemplary embodiment.

Figure 18:
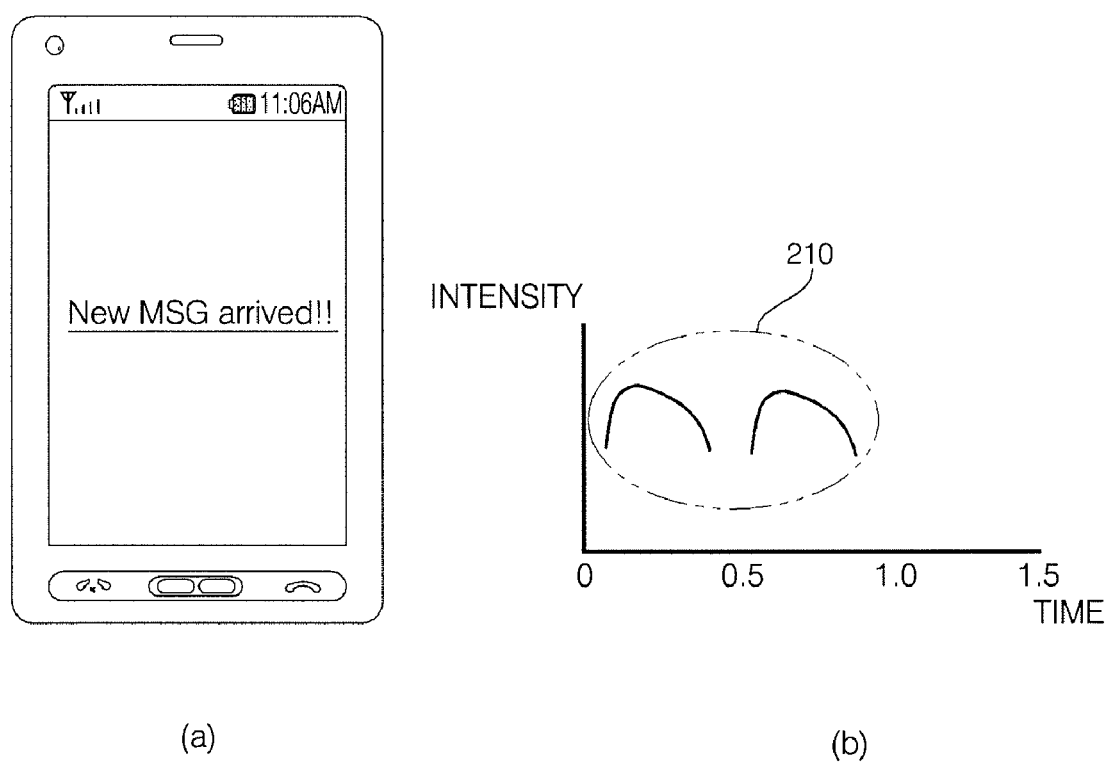
FIGS. 18 through 21 illustrate diagrams for explaining the generation of a haptic effect upon the occurrence of an event according to a tenth exemplary embodiment of the present invention.

Referring to FIGS. 18(a) and 18(b), if a message-receiving event occurs, i.e., if a message is received from an external mobile terminal, the controller 180 may determine whether the phone number of the external mobile terminal is a registered phone number and identify an entry name or a group name with which the phone number of the external mobile terminal is registered in the mobile terminal 100. If the phone number of the external mobile terminal is registered with an entry name 'boyfriend' or 'girlfriend', the controller 180 may control the haptic module 157 to generate a haptic effect 210 corresponding to the heart symbol.

Figure 19:
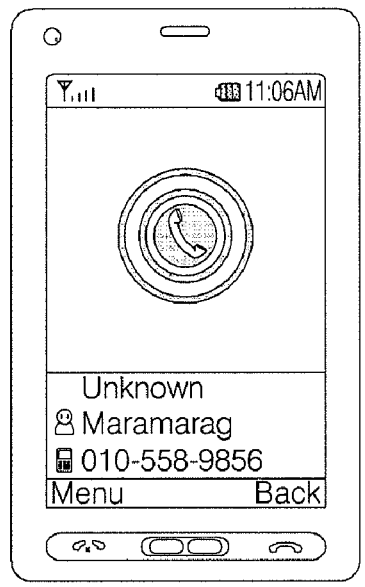
Figure 19:
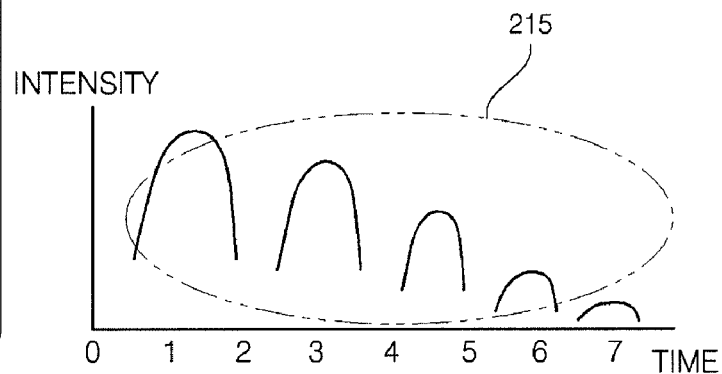

Referring to FIGS. 19(a) and 19(b), if a call-receiving event occurs, i.e., if an incoming call is detected, the controller 180 may control a ringtone corresponding to the caller of the detected incoming call to be output, and may control the haptic module 157 to generate a haptic effect 215 whose intensity or pattern corresponds to the ringtone.

Therefore, the user may easily identify the caller of the detected incoming call based on the haptic effect 215 even when no ringtone is output by the mobile terminal 100.

Figure 20:
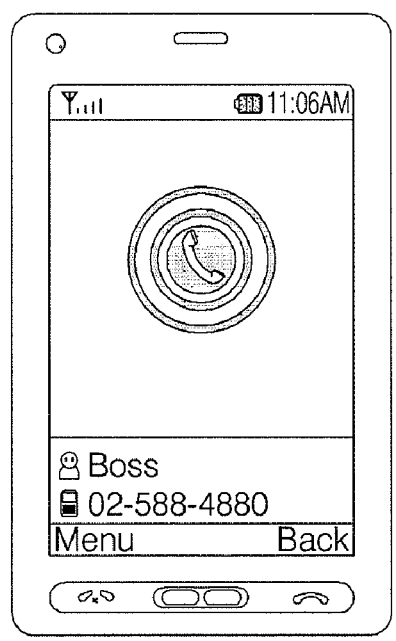
Figure 20:
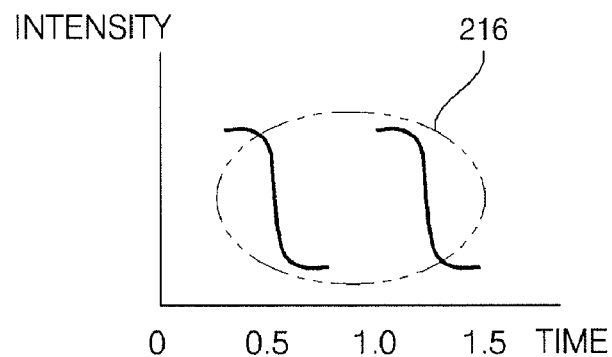

For example, referring to FIG. 20(a), if an incoming call from a phone number registered with an entry name 'boss' is detected, the controller 180 may display a screen indicating the detection of the incoming call in a display region. Thereafter, referring to FIG. 20(b), the controller 180 may control the haptic module 157 to generate a haptic effect 216 whose intensity or pattern corresponds to the shape of one of the letters in the entry name 'boss.' Therefore, the user may easily identify the caller of the incoming call based on the haptic effect 216.

Figure 21:
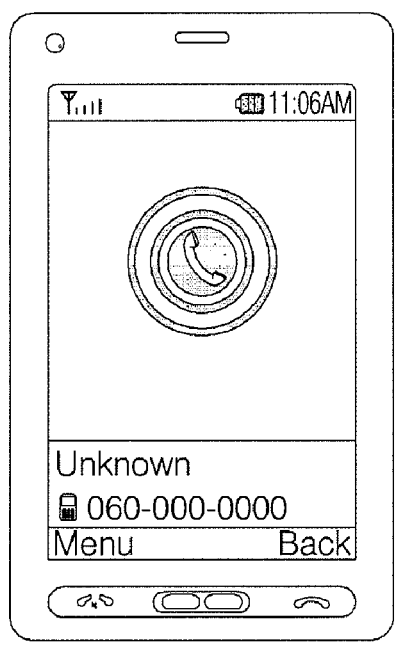
Figure 21:
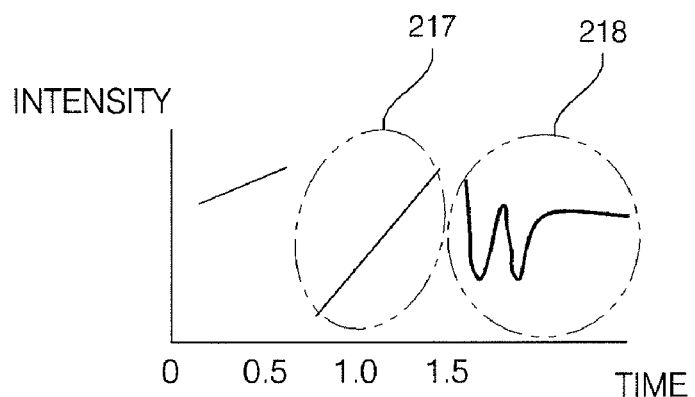

Referring to FIG. 21(a), if an incoming call from a blocked phone number or a number registered as a spam phone number is detected, the controller 180 may display a screen indicating the detection of the incoming call in a display region. Thereafter, referring to FIG. 21(b), the controller 180 may control the haptic module 157 to generate a haptic effect indicating the detection of the incoming call. More specifically, the controller 180 may determine the distance between a key to receive a call and an object detected to be near and approaching the display module 151 by the proximity sensor 141. If it is determined that the distance between the key and the object has gradually decreased, the controller 180 may control the haptic module 157 to generate a haptic effect 217. Thus, the user may identify whether a command to receive the incoming call from the unregistered phone number is about to be issued based on the haptic effect 217.

After the issuance of the command to receive the incoming call from the unregistered phone number, the controller 180 may control the haptic module 157 to generate a haptic effect 218 in order to alert the user to the reception of the incoming call from the unregistered phone number.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

According to the present invention, it is possible to visualize various information regarding a haptic effect generated in response to a haptic-effect signal such as the intensity, pattern, frequency, moving direction and/or moving speed of the haptic effect and thus to help a user easily identify the haptic effect with his or her sense of vision, rather than with his or her sense of touch. In addition, according to the present invention, it is possible to render a haptic effect generated in response to the approach of an object to a mobile terminal as an image that varies according to the distance between the object and the mobile terminal. Thus, it is possible for a user to easily identify the state of the object and the state of the mobile terminal and thus to effectively control the operation of the mobile terminal even when no haptic effect is generated due to the mobile terminal being placed in a manner-mode.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:

detecting an occurrence of an event, the event occurring in response to a request for access to the mobile terminal by an external mobile terminal;

determining whether the event is a haptic-effect-accompanying event;

detecting an identification information of the external mobile terminal from the detected event when the event is the haptic-effect-accompanying event;

determining whether a haptic-effect pattern corresponding to the detected identification information is set in advance in the mobile terminal when the detected identification information exists in a contact list of the mobile terminal, the haptic-effect pattern being varied according to the detected identification information; and when the haptic-effect pattern is set in advance in the mobile terminal, generating a haptic effect corresponding to the haptic-effect pattern, and varying an image displayed on a screen of the mobile terminal in accordance with the haptic-effect pattern while simultaneously generating the haptic effect corresponding to the haptic-effect pattern, wherein, when the event involves displaying a list of items with different importance levels in a display region of the mobile terminal, the step of generating the haptic effect comprises generating the haptic effect in an area in the display region where an item of the list having a high importance level is displayed, the method further comprises detecting a movement of a cursor toward the item with the high importance level, or detecting an object having a distance from the item with the high importance level that gradually changes, based on a signal provided by a proximity sensor, and the step of generating the haptic effect further comprises varying an intensity of the haptic effect according to a corresponding one of the movement of the cursor or the distance.

2. The method of claim 1, wherein the haptic effect includes a vibration.

3. The method of claim 1, wherein a haptic-effect intensity or the haptic-effect pattern corresponds to a shape of a letter in a name of the event.

4. The method of claim 1, wherein a haptic-effect intensity or the haptic-effect pattern corresponds to a volume or an audio output pattern upon the occurrence of the event.

5. The method of claim 1, further comprising:

when the mobile terminal is equipped with at least two subscriber identification module (SIM) cards or uses at least two phone numbers, numbering the at least two SIM cards or the at least two phone numbers; and generating a second haptic effect corresponding to a number of a SIM card or a phone number that is used for the event.

6. The method of claim 1, wherein, when the item with the high importance level is yet to appear in the display region, the step of generating the haptic effect further comprises:

generating the haptic effect in an area in the display region corresponding to a position of the item with the high importance level relative to a number of items currently being displayed in the display region.

7. The method of claim 1, wherein, when the list is a list of received messages, a list of emails or a list of calls, the item with the high importance level includes an unread message, an unread email or a missed call or includes a message, an email or a call deemed important by a user.

8. The method of claim 1, wherein, when the event is an error event that occurs during an execution of an application in the mobile terminal, a haptic-effect intensity or the haptic-effect pattern corresponds to a type of error occurring during the execution of the application.

9. The method of claim 8, wherein the error event includes an error event that occurs during a reception or display of a webpage or an error event that occurs during an opening of a document file, an audio file or a video file.

10. The method of claim 1, further comprising:

when the event is an event associated with a payment of charges or a transmission of personal information, determining a distance between an object and a touch screen, on which a key to pay the charges or a key to input or send the personal information is displayed, based on a signal provided by a proximity sensor, wherein the step of generating the haptic effect comprises varying an intensity of the haptic effect according to a distance between the object and the touch screen.

11. The method of claim 1, further comprising:

when the event is an event associated with a payment of charges or a transmission of personal information, determining whether a command to pay the charges or a command to input or send the personal information has been issued, and generating a second haptic effect when the command to pay the charges or the command to input or send the personal information is determined to have been issued.

12. A method of controlling a mobile terminal, the method comprising:

detecting the occurrence of an event;

classifying the event into one of a first-event group including an event that occurs in response to a command to connect the mobile terminal to an external mobile terminal by a user, a second-event group including an event that occurs in response to a request for access to the mobile terminal by an external mobile terminal, and a third-event group including events that belong to neither the first- nor second-event group;

determining whether the event is a haptic-effect-accompanying event;

when the event is determined to be the haptic-effect-accompanying event, generating an event group specific haptic effect comprising a corresponding one of a first-event group haptic effect, a second-event group haptic effect and a third-event group haptic effect; and varying an image displayed on a screen of the mobile terminal in accordance with the event group specific haptic effect while simultaneously generating the event group specific haptic effect, wherein, when the event involves displaying a list of items with different importance levels in a display region of the mobile terminal, the method includes generating another haptic effect in an area in the display region where an item of the list having a high importance level is displayed, detecting a movement of a cursor toward the item with the high importance level, or detecting an object having a distance from the item with the high importance level that gradually changes, based on a signal provided by a proximity sensor, and varying an intensity of the another haptic effect according to a corresponding one of the movement of the cursor or the distance.

13. The method of claim 12, wherein the first-event group includes one of an internet-access event, a Bluetooth network-access event, and an instant messenger network-access event, the second-event group includes one of a call-receiving event, a text message-receiving event, a multimedia message-receiving event and an email-receiving event and the third-event group includes one of an alarm event, a scheduler event, a battery alert event, and a missed call-alert event.

14. A method of controlling a mobile terminal, the method comprising:

detecting the occurrence of an event;

determining whether the event is a haptic-effect-accompanying event;

when the event is determined to be the haptic-effect-accompanying event, generating a haptic effect corresponding to the event, wherein, when the event involves an arrival of a schedule time set in the mobile terminal for a predetermined scheduled event, a pattern of the haptic effect corresponds to an importance level of the predetermined scheduled event; and varying an image displayed on a screen of the mobile terminal in accordance with the importance level of the predetermined scheduled event while simultaneously generating the haptic effect in accordance with the pattern of the haptic effect that corresponds to the importance level of the predetermined scheduled event, wherein, when the event involves displaying a list of items with different importance levels in a display region of the mobile terminal, the step of generating the haptic effect comprises generating the haptic effect in an area in the display region where an item of the list having a high importance level is displayed, the method further comprises detecting a movement of a cursor toward the item with the high importance level, or detecting an object having a distance from the item with the high importance level that gradually changes, based on a signal provided by a proximity sensor, and the step of generating the haptic effect further comprises varying an intensity of the haptic effect according to a corresponding one of the movement of the cursor or the distance.

15. A method of controlling a mobile terminal, the method comprising:

detecting the occurrence of an event;

determining whether the event is a haptic-effect-accompanying event;

when the event is determined to be the haptic-effect-accompanying event, generating a first haptic effect in accordance with a first haptic-effect pattern corresponding to the event;

when the event is an event that occurs in response to an issuance of a command to connect the mobile terminal to an external mobile terminal by a user, determining whether there is a file that has been sent by the external mobile terminal, and when there is a file that has been sent by the external mobile terminal, generating a second haptic effect in accordance with a second haptic-effect pattern corresponding to a type of the file sent by the external mobile terminal; and varying an image displayed on a screen of the mobile terminal in accordance with one of the first haptic-effect pattern and the second haptic-effect pattern while simultaneously generating the one of the first and second haptic effects in accordance with the one of the first haptic-effect pattern and the second haptic-effect pattern, wherein, when the event involves displaying a list of items with different importance levels in a display region of the mobile terminal, the method includes generating another haptic effect in an area in the display region where an item of the list having a high importance level is displayed, detecting a movement of a cursor toward the item with the high importance level, or detecting an object having a distance from the item with the high importance level that gradually changes, based on a signal provided by a proximity sensor, and varying an intensity of the another haptic effect according to a corresponding one of the movement of the cursor or the distance.

16. A method of controlling a mobile terminal, the method comprising:

detecting the occurrence of an event;

determining whether the event is a haptic-effect-accompanying event;

when the event is determined to be the haptic-effect-accompanying event, generating a haptic effect corresponding to the event, wherein, when the event is an event that occurs in response to a command to connect the mobile terminal to an external mobile terminal by a user, a pattern of the haptic effect corresponds to a name or type of the event; and varying an image displayed on a screen of the mobile terminal in accordance with the pattern while simultaneously generating the haptic effect in accordance with the pattern, wherein, when the event involves displaying a list of items with different importance levels in a display region of the mobile terminal, the step of generating the haptic effect comprises generating the haptic effect in an area in the display region where an item of the list having a high importance level is displayed, the method further comprises detecting a movement of a cursor toward the item with the high importance level, or detecting an object having a distance from the item with the high importance level that gradually changes, based on a signal provided by a proximity sensor, and the step of generating the haptic effect further comprises varying an intensity of the haptic effect according to a corresponding one of the movement of the cursor or the distance.

17. The method of claim 16, wherein the information regarding the external mobile terminal includes a phone number or Bluetooth number of the external mobile terminal, an entry name or a group name to which the phone number or Bluetooth number of the external mobile terminal is registered in the mobile terminal, a phone ringtone corresponding to the phone number of the external mobile terminal, or a Bluetooth ringtone corresponding to the Bluetooth number of the external mobile terminal.

18. The method of claim 17, further comprising:

when the phone number of the external mobile terminal is a blocked phone number or a number registered as a spam phone number, determining a distance between an object and a touch screen, on which a key to receive an incoming call is displayed, based on a signal provided by a proximity sensor, wherein the step of generating the haptic effect comprises varying an intensity of the haptic effect according to the distance between the object and the touch screen.

19. The method of claim 17, further comprising:

when the phone number of the external mobile terminal is a blocked phone number or a number registered as a spam phone number, determining whether a command to receive an incoming call has been issued, and generating a second haptic effect when the command to receive an incoming call is determined to have been issued.

20. A mobile terminal, comprising:

a haptic module configured to generate a haptic effect; and a controller operatively connected to the haptic module and configured to:

detect an occurrence of an event, the event occurring in response to a request for access to the mobile terminal by an external mobile terminal, determine that the event is a haptic-effect-accompanying event, detect an identification information of the external mobile terminal from the detected event in response to the determination, determine whether a haptic-effect pattern corresponding to the detected identification information is set in advance in the mobile terminal when the detected identification information exists in a contact list of the mobile terminal, the haptic-effect pattern being varied according to the detected identification information, and when the haptic-effect pattern is set in advance in the mobile terminal, generate a haptic effect corresponding to the haptic-effect pattern, and vary an image displayed on a screen of the mobile terminal in accordance with the haptic-effect pattern while simultaneously generating the haptic effect corresponding to the haptic-effect pattern, wherein, when the event involves displaying a list of items with different importance levels in a display region of the mobile terminal, the controller is configured to generate the haptic effect in an area in the display region where an item with a high importance level is displayed, and detect a movement of a cursor toward the item with the high importance level or detects an object having distance from the item with the high importance level that gradually changes based on a signal provided by a proximity sensor, and vary an intensity of the haptic effect according to a corresponding one of the movement of the cursor or the distance between the object and the item with the high importance level.

21. The mobile terminal of claim 20, wherein the haptic effect includes a vibration.

22. The mobile terminal of claim 20, wherein a haptic-effect intensity or the haptic-effect pattern corresponds to a shape of a letter in a name of the event.

23. The mobile terminal of claim 20, wherein a haptic-effect intensity or the haptic-effect pattern corresponds to a volume or an audio output pattern.

24. The mobile terminal of claim 20, wherein, when the mobile terminal is equipped with at least two subscriber identification module (SIM) cards or uses at least two phone numbers, the controller is configured to number the at least two SIM cards or the at least two phone numbers and generate a second haptic effect corresponding to the number of a number of the SIM card or phone number that is used for the event.

25. The mobile terminal of claim 20, wherein, when the item with the high importance level is yet to appear in the display region, the controller is configured to generate the haptic effect in an area in the display region corresponding to a position of the item with the high importance level relative to a number of items currently being displayed in the display region.

26. The mobile terminal of claim 20, wherein, when the list is a list of received messages, a list of emails or a list of calls, the item with the high importance level includes an unread message, an unread email or a missed call or includes a message, an email or a call deemed important by a user.

27. The mobile terminal of claim 20, wherein, when the event is an error event that occurs during an execution of an application in the mobile terminal, a haptic-effect intensity or the haptic-effect pattern corresponds to a type of error occurred during the execution of the application.

28. The mobile terminal of claim 20, wherein, when the event is an event associated with a payment of charges or a transmission of personal information, the controller is configured to determine a distance between an object and a touch screen, on which a key to pay the charges or a key to input or send the personal information is displayed, based on a signal provided by a proximity sensor, and vary an intensity of the haptic effect according to the distance between the object and the touch screen.

29. The mobile terminal of claim 20, wherein, when the event is an event associated with a payment of charges or a transmission of personal information, the controller is configured to determine when a command to pay the charges or a command to input or send the personal information has been issued, and generate a second haptic effect when the command to pay the charges or the command to input or send the personal information is determined to have been issued.

30. A mobile terminal, comprising:

a controller configured to detect an occurrence of an event, classify the event into one of a first-event group including events that occur in response to a command to connect the mobile terminal to an external mobile terminal by a user, a second-event group including events that occur in response to a request for access to the mobile terminal by an external mobile terminal, and a third-event group including events that belong to neither the first- nor second-event group, determine whether the event is a haptic-effect-accompanying event, when the event is determined to be the haptic-effect-accompanying event, generate an event group specific haptic effect comprising a corresponding one of a first-event group haptic effect, a second-event group haptic effect and a third-event group haptic effect, and vary an image displayed on a screen of the mobile terminal in accordance with the event group specific haptic effect while simultaneously generating the event group specific haptic effect, wherein, when the event involves displaying a list of items with different importance levels in a display region of the mobile terminal, the controller is configured to generate another haptic effect in an area in the display region where an item with a high importance level is displayed, and detect a movement of a cursor toward the item with the high importance level or detects an object having distance from the item with the high importance level that gradually changes based on a signal provided by a proximity sensor, and vary an intensity of the another haptic effect according to a corresponding one of the movement of the cursor or the distance between the object and the item with the high importance level.

31. A mobile terminal, comprising:

a controller configured to detect an occurrence of an event, determine whether the event is a haptic-effect-accompanying event, when the event is determined to be the haptic-effect-accompanying event, generate a haptic effect corresponding to the event when the event is determined to be a haptic-effect-accompanying event, wherein, when the event involves an arrival of a schedule time set in the mobile terminal for a predetermined scheduled event, a pattern of the haptic effect corresponds to an importance level of the predetermined scheduled event, and vary an image displayed on a screen of the mobile terminal in accordance with the importance level of the predetermined scheduled event while simultaneously generating the haptic effect in accordance with the pattern of the haptic effect that corresponds to the importance level of the predetermined scheduled event, wherein, when the event involves displaying a list of items with different importance levels in a display region of the mobile terminal, the controller is configured to generate the haptic effect in an area in the display region where an item with a high importance level is displayed, and detect a movement of a cursor toward the item with the high importance level or detects an object having distance from the item with the high importance level that gradually changes based on a signal provided by a proximity sensor, and vary an intensity of the haptic effect according to a corresponding one of the movement of the cursor or the distance between the object and the item with the high importance level.

32. A mobile terminal, comprising:

a controller configured to detect an occurrence of an event, determine whether the event is a haptic-effect-accompanying event, when the event is determined to be the haptic-effect-accompanying event, generate a first haptic effect in accordance with a first haptic-effect pattern corresponding to the event, wherein, when the event is an event that occurs in response to a command to connect the mobile terminal to an external mobile terminal by a user, determine when there is a file that has been sent by the external mobile terminal, and when there is a file that has been sent by the external mobile terminal, generate a second haptic effect in accordance with a second haptic-effect pattern corresponding to a type of the file sent by the external mobile terminal, and vary an image displayed on a screen of the mobile terminal in accordance with one of the first haptic-effect pattern and the second haptic-effect pattern while simultaneously generating the one of the first and second haptic effects in accordance with the one of the first haptic-effect pattern and the second haptic-effect pattern, wherein, when the event involves displaying a list of items with different importance levels in a display region of the mobile terminal, the controller is configured to generate another haptic effect in an area in the display region where an item with a high importance level is displayed, and detect a movement of a cursor toward the item with the high importance level or detects an object having distance from the item with the high importance level that gradually changes based on a signal provided by a proximity sensor, and vary an intensity of the another haptic effect according to a corresponding one of the movement of the cursor or the distance between the object and the item with the high importance level.

33. A mobile terminal, comprising:

a controller configured to detect an occurrence of an event, determine whether the event is a haptic-effect-accompanying event, when the event is determined to be the haptic-effect-accompanying event, generate a haptic effect corresponding to the event, wherein, when the event is an event that occurs in response to a command to connect the mobile terminal to an external mobile terminal by a user, a pattern of the first haptic effect corresponds to a name or type of the event, and vary an image displayed on a screen of the mobile terminal in accordance with the pattern while simultaneously generating the haptic effect in accordance with the pattern, wherein, when the event involves displaying a list of items with different importance levels in a display region of the mobile terminal, the controller is configured to generate the haptic effect in an area in the display region where an item with a high importance level is displayed, and detect a movement of a cursor toward the item with the high importance level or detects an object having distance from the item with the high importance level that gradually changes based on a signal provided by a proximity sensor, and vary an intensity of the haptic effect according to a corresponding one of the movement of the cursor or the distance between the object and the item with the high importance level.

34. The mobile terminal of claim 33, wherein the information regarding the external mobile terminal includes a phone number or Bluetooth number of the external mobile terminal, an entry name or a group name to which the phone number or Bluetooth number of the external mobile terminal is registered in the mobile terminal, a phone ringtone corresponding to the phone number of the external mobile terminal, or a Bluetooth ringtone corresponding to the Bluetooth number of the external mobile terminal.

35. The mobile terminal of claim 34, wherein, when the phone number of the external mobile terminal is a blocked phone number or a number registered as a spam phone number, the controller is configured to determine a distance between an object and a touch screen, on which a key to receive an incoming call is displayed, based on a signal provided by a proximity sensor, and vary an intensity of the haptic effect according to the distance between the object and the touch screen.

36. The mobile terminal of claim 34, wherein, when the phone number of the external mobile terminal is a blocked phone number or a number registered as a spam phone number, the controller is configured to determine when a command to receive an incoming call has been issued, and generate a second haptic effect when the command to receive an incoming call is determined to have been issued.

\* \* \* \* \*